(12) United States Patent
Munsell et al.

(10) Patent No.: US 9,416,677 B2
(45) Date of Patent: Aug. 16, 2016

(54) GAS TURBINE ENGINE FORWARD BEARING COMPARTMENT ARCHITECTURE

(71) Applicant: UNITED TECHNOLOGIES CORPORATION, Hartford, CT (US)

(72) Inventors: Peter M. Munsell, Granby, CT (US); Philip S. Stripinis, Rocky Hill, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 0 days.

(21) Appl. No.: 14/745,724

(22) Filed: Jun. 22, 2015

(65) Prior Publication Data

US 2015/0285090 A1    Oct. 8, 2015

Related U.S. Application Data

(63) Continuation-in-part of application No. 14/640,251, filed on Mar. 6, 2015, which is a continuation of application No. 13/346,832, filed on Jan. 10, 2012, now Pat. No. 9,004,849.

(51) Int. Cl.
| | |
|---|---|
| *F01D 5/06* | (2006.01) |
| *F01D 15/12* | (2006.01) |
| *F01D 25/16* | (2006.01) |
| *F01D 25/24* | (2006.01) |
| *F01D 9/06* | (2006.01) |

(Continued)

(52) U.S. Cl.
CPC *F01D 15/12* (2013.01); *F01D 5/06* (2013.01); *F01D 9/065* (2013.01); *F01D 25/16* (2013.01); *F01D 25/24* (2013.01); *F02C 6/08* (2013.01); *F02C 7/36* (2013.01); *F05D 2260/40311* (2013.01)

(58) Field of Classification Search
CPC ........... F01D 5/06; F01D 15/12; F01D 25/16; F01D 25/24; F05D 2220/32; F05D 2240/50; F05D 2240/55; F05D 2260/40311
See application file for complete search history.

(56) References Cited

U.S. PATENT DOCUMENTS

| 3,287,906 A | 11/1966 | McCormick |
| 3,754,484 A | 8/1973 | Roberts |

(Continued)

FOREIGN PATENT DOCUMENTS

| EP | 2213864 | 8/2010 |
| EP | 2362081 | 8/2011 |

(Continued)

OTHER PUBLICATIONS

Conference on Engineering and Physics: Synergy for Success 2006. Journal of Physics: Conference Series vol. 105. London, UK. Oct. 5, 2006.

(Continued)

*Primary Examiner* — Igor Kershteyn
(74) *Attorney, Agent, or Firm* — Carlson, Gaskey & Olds P.C.

(57) ABSTRACT

A gas turbine engine includes a front center body case structure. A geared architecture is at least partially supported by the front center body case structure. A bearing structure is mounted to the front center body case structure to rotationally support a shaft driven by the geared architecture, the shaft drive a fan. A bearing compartment passage structure is in communication with the bearing structure through the front center body case structure. A method is also disclosed.

20 Claims, 5 Drawing Sheets

(51) Int. Cl.
*F02C 6/08* (2006.01)
*F02C 7/36* (2006.01)

(56) References Cited

U.S. PATENT DOCUMENTS

| | | | |
|---|---|---|---|
| 3,892,358 A | 7/1975 | Gisslen | |
| 3,990,814 A | 11/1976 | Leone | |
| 4,130,872 A | 12/1978 | Haloff | |
| 4,645,415 A * | 2/1987 | Hovan | F01D 25/125 415/115 |
| 5,080,555 A * | 1/1992 | Kempinger | F01D 9/065 415/108 |
| 5,433,674 A | 7/1995 | Sheridan et al. | |
| 5,447,411 A | 9/1995 | Curley et al. | |
| 5,524,847 A | 6/1996 | Brodell et al. | |
| 5,778,659 A | 7/1998 | Duesler et al. | |
| 5,857,836 A | 1/1999 | Stickler et al. | |
| 5,915,917 A | 6/1999 | Eveker et al. | |
| 5,975,841 A | 11/1999 | Lindemuth et al. | |
| 6,223,616 B1 | 5/2001 | Sheridan | |
| 6,318,070 B1 | 11/2001 | Rey et al. | |
| 6,623,238 B2 * | 9/2003 | Langston | F02C 7/277 415/112 |
| 6,814,541 B2 | 11/2004 | Evans et al. | |
| 7,021,042 B2 | 4/2006 | Law | |
| 7,201,558 B2 * | 4/2007 | Norris | F01D 11/005 415/110 |
| 7,383,686 B2 * | 6/2008 | Aycock | F01D 9/065 60/39.511 |
| 7,591,754 B2 | 9/2009 | Duong et al. | |
| 7,824,305 B2 | 11/2010 | Duong et al. | |
| 7,926,260 B2 | 4/2011 | Sheridan et al. | |
| 8,205,432 B2 | 6/2012 | Sheridan | |
| 2007/0084188 A1 | 4/2007 | Orlando et al. | |
| 2007/0193276 A1 | 8/2007 | Corattiyil et al. | |
| 2009/0081039 A1 | 3/2009 | McCune | |
| 2010/0148396 A1 | 6/2010 | Xie et al. | |
| 2010/0160105 A1 | 6/2010 | Sheridan et al. | |
| 2010/0331139 A1 | 12/2010 | McCune | |

FOREIGN PATENT DOCUMENTS

| | | |
|---|---|---|
| GB | 1516041 | 6/1978 |
| GB | 2041090 | 9/1980 |
| WO | 2007038674 | 4/2007 |

OTHER PUBLICATIONS

Kurzke, J. (2009). Fundamental differences between conventional and geared turbofans. Proceedings of ASME Turbo Expo: Power for Land, Sea, and Air. 2009, Orlando, Florida.

Agarwal, B.D. and Broutman, L.J. (1990). Analysis and performance of fiber composites, 2nd Edition. John Wiley & Sons, Inc. New York: New York.

Brines, G.L. (1990). The turbofan of tomorrow. Mechanical Engineering: The Journal of the American Society of Mechanical Engineers, 108(8), 65-67.

Faghri, A. (1995). Heat pipe and science technology. Washington, D.C.: Taylor & Francis.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modem Machine Shop. Retrieved from: http://www.mmsonline.com/articles/composite-fan-blade-containment-case.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.

Brennan, P.J. and Kroliczek, E.J. (1979). Heat pipe design handbook. Prepared for National Aeronautics and Space Administration by B & K Engineering, Inc. Jun. 1979.

Horikoshi, S. and Serpone, N. (2013). Introduction to nanoparticles. Microwaves in nanoparticle synthesis. Wiley-VCH Verlag GmbH & Co. KGaA.

Kerrebrock, J.L. (1977). Aircraft engines and gas turbines. Cambridge, MA: The MIT Press.

Xie, M. (2008). Intelligent engine systems: Smart case system. NASA/CR-2008-215233.

Knip, Jr., G. (1987). Analysis of an advanced technology subsonic turbofan incorporating revolutionary materials. NASA Technical Memorandum. May 1987.

Willis, W.S. (1979). Quiet clean short-haul experimental engine (QCSEE) final report. NASA/CR-159473.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press.

Ramsden, J.M. (Ed.). (1978). The new European airliner. Flight International, 113(3590). Jan. 7, 1978.

Langston, L. and Faghri, A. Heat pipe turbine vane cooling. Prepared for Advanced Turbine Systems Annual Program Review. Morgantown, West Virginia. Oct. 17-19, 1995.

Oates, G.C. (Ed.). (1989). Aircraft propulsion systems and technology and design. Washington, D.C.: American Institute of Aeronautics, Inc.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc.

Ratna, D. (2009). Handbook of thermoset resins. Shawbury, UK: iSmithers.

Wendus, B.E., Stark, D.F., Holler, R.P., and Funkhouser, M.E. (2003). Follow-on technology requirement study for advanced subsonic transport. NASA/CR-2003-212467.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983.

Dickey, T.A. and Dobak, E.R. (1972). The evolution and development status of ALF 502 turbofan engine. National Aerospace Engineering and Manufacturing Meeting. San Diego, California. Oct. 2-5, 1972.

Gunston, B. (Ed.) (2000). Jane's aero-engines, Issue seven. Coulsdon, Surrey, UK: Jane's Information Group Limited.

Ivchenko-Progress D-436. Jane's Aero-engines, Aero-engines—Turbofan. Feb. 8, 2012.

Ivchenko-Progress AI-727M. Jane's Aero-engines, Aero-engines—Turbofan. Nov. 27, 2011.

(56) References Cited

OTHER PUBLICATIONS

Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.

NASA Conference Publication. Quiet, powered-lift propulsion. Cleveland, Ohio. Nov. 14-15, 1978.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8), p. 32.
Hendricks, E.S. and Tong, M.T. (2012). Performance and weight estimates for an advanced open rotor engine. NASA/TM-2012-217710.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883.
Zalud, T. (1998). Gears put a new spin on turbofan performance. Machine Design, 70(20), p. 104.
Search Report from corresponding EP application.

* cited by examiner

GAS TURBINE ENGINE FORWARD BEARING COMPARTMENT ARCHITECTURE

RELATED APPLICATIONS

This application is a continuation-in-part of U.S. patent application Ser. No. 14/640,251, filed Mar. 6, 2015, which was a continuation of prior U.S. patent application Ser. No. 13/346,832, filed Jan. 10, 2012, now U.S. Pat. No. 9,004,849 the entirety of which is herein incorporated by reference.

BACKGROUND

The present disclosure relates to a gas turbine engine, and in particular, to a case structure therefor.

Geared turbofan architectures may utilize epicyclic reduction gearboxes with planetary or star gear trains for their compact design and efficient high gear reduction capabilities. The geared turbofan architecture de-couples a fan rotor from a low spool through the reduction gearbox which results in isolation of the forwardmost bearing compartment.

SUMMARY

In a featured embodiment, a gas turbine engine includes a front center body case structure. A geared architecture is at least partially supported by the front center body case structure. A bearing structure is mounted to the front center body case structure to rotationally support a shaft driven by the geared architecture. The shaft drives a fan. A bearing compartment passage structure is in communication with the bearing structure through the front center body case structure.

In another embodiment according to the previous embodiment, the bearing structure includes a seal.

In another embodiment according to any of the previous embodiments, the bearing structure includes a bearing.

In another embodiment according to any of the previous embodiments, the bearing compartment passage structure includes a hollow front center body strut.

In another embodiment according to any of the previous embodiments, the hollow front center body strut is in fluid communication with a fan rotor bearing support structure which at least partially supports the bearing structure.

In another embodiment according to any of the previous embodiments, further includes a conditioning device in communication with the bearing compartment passage structure.

In another embodiment according to any of the previous embodiments, the conditioning device is a heat exchanger.

In another embodiment according to any of the previous embodiments, the conditioning device is in communication with a high pressure compressor.

In another embodiment according to any of the previous embodiments, the high pressure compressor is axially downstream of the geared architecture.

In another embodiment according to any of the previous embodiments, the conditioning device is radially outboard of a low pressure compressor.

In another embodiment according to any of the previous embodiments, the low pressure compressor is downstream of the geared architecture.

In another embodiment according to any of the previous embodiments, the bearing structure is axially between the fan and the geared architecture.

In another embodiment according to any of the previous embodiments, the front center body case structure defines a core flow path for a core airflow.

In another embodiment according to any of the previous embodiments, there are three turbine rotors, with a most downstream of the three turbine rotors driving the geared architecture.

In another featured embodiment, the method of communicating a buffer supply air for a gas turbine engine includes communicating a buffer supply air across a core flow path, and communicating the buffer supply air through a hollow front center body strut of a front center body case structure which defines the core flow path, the hollow front center body strut within the core flow path.

In another embodiment according to the previous embodiment, further including communicating the buffer supply air to a bearing compartment forward of a geared architecture.

In another embodiment according to the previous embodiment, further including, communicating the buffer supply air through a conditioning device upstream of the hollow front center body strut.

In another embodiment according to the previous embodiment, further including, communicating the buffer supply air to a bearing structure mounted to a front center body case structure which defines the core flow path. The bearing structure rotationally supports a shaft driven by a geared architecture.

In another embodiment according to the previous embodiment, further including, driving a fan through the geared architecture. The bearing structure is axially located between the fan and the geared architecture.

In another featured embodiment, a method of communicating a buffer supply air for a gas turbine engine includes communicating a buffer supply air across a core flow path, communicating the buffer supply air to a bearing structure mounted to a front center body case structure which defines the core flow path, the bearing structure rotationally supporting a shaft driven by a geared architecture, driving a fan through the geared architecture, the bearing structure axially located between the fan and the geared architecture, and communicating the buffer supply air to a spinner supported by the fan.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
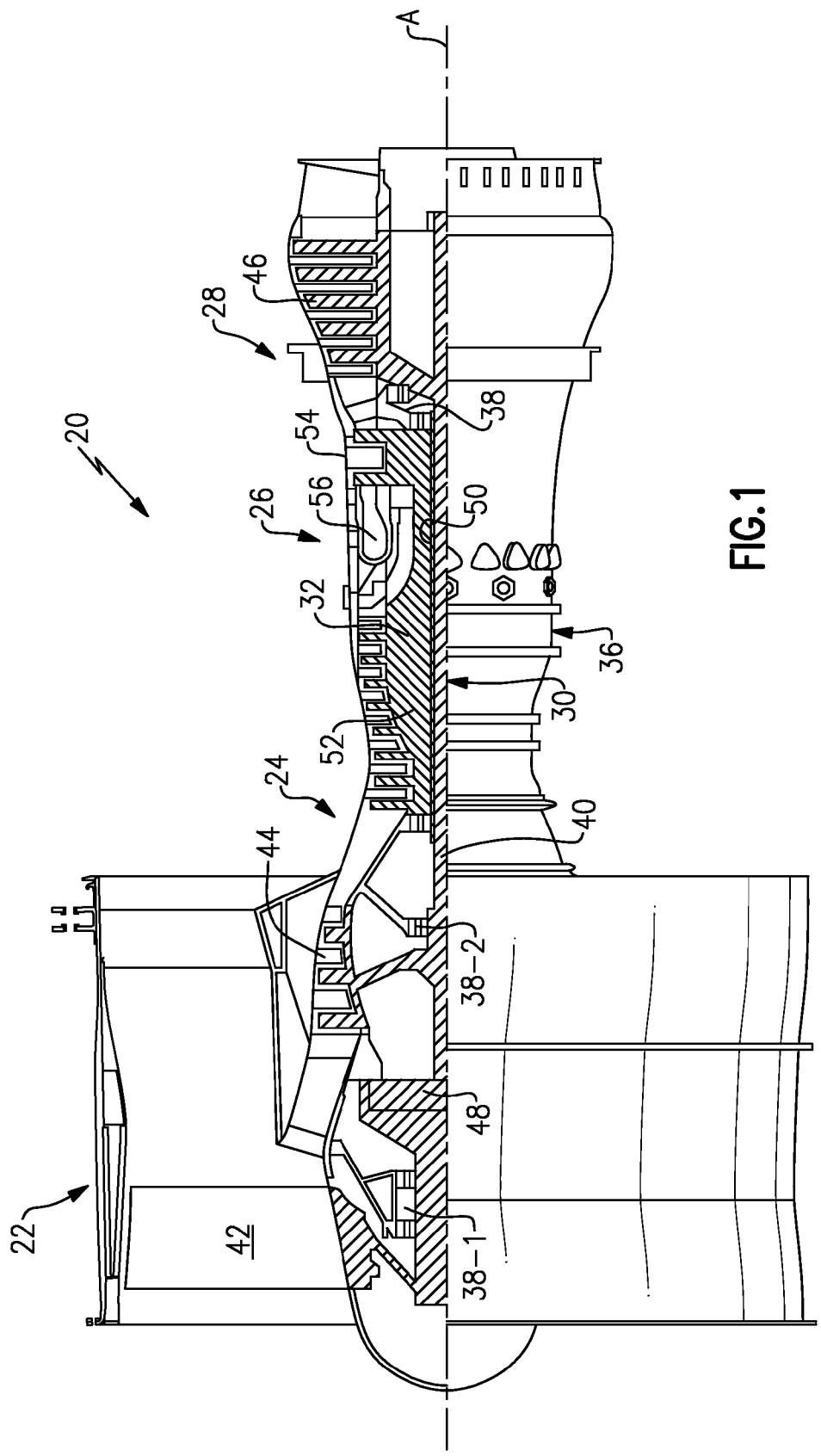
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines such as a three-spool (plus fan) engine wherein an intermediate spool includes an intermediate pressure compressor (IPC) between the LPC and HPC and an intermediate pressure turbine (IPT) between the HPT and LPT.

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor 44 ("LPC") and a low pressure turbine 46 ("LPT"). The inner shaft 40 drives the fan 42 through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") and high pressure turbine 54 ("HPT"). A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the low pressure compressor 44 then the high pressure compressor 52, mixed with the fuel and burned in the combustor 56, then expanded over the high pressure turbine 54 and low pressure turbine 46. The turbines 54, 46 rotationally drive the respective low spool 30 and high spool 32 in response to the expansion.

The engine shafts 40, 50 are supported at a plurality of points by bearing structures 38 within the engine static structure 36. In one non-limiting embodiment, bearing structures 38 includes a #1 bearing structure 38-1 forward of the gearbox 72 and a #2 bearing structure 38-2 located aft of the gearbox 72.

Figure 2:
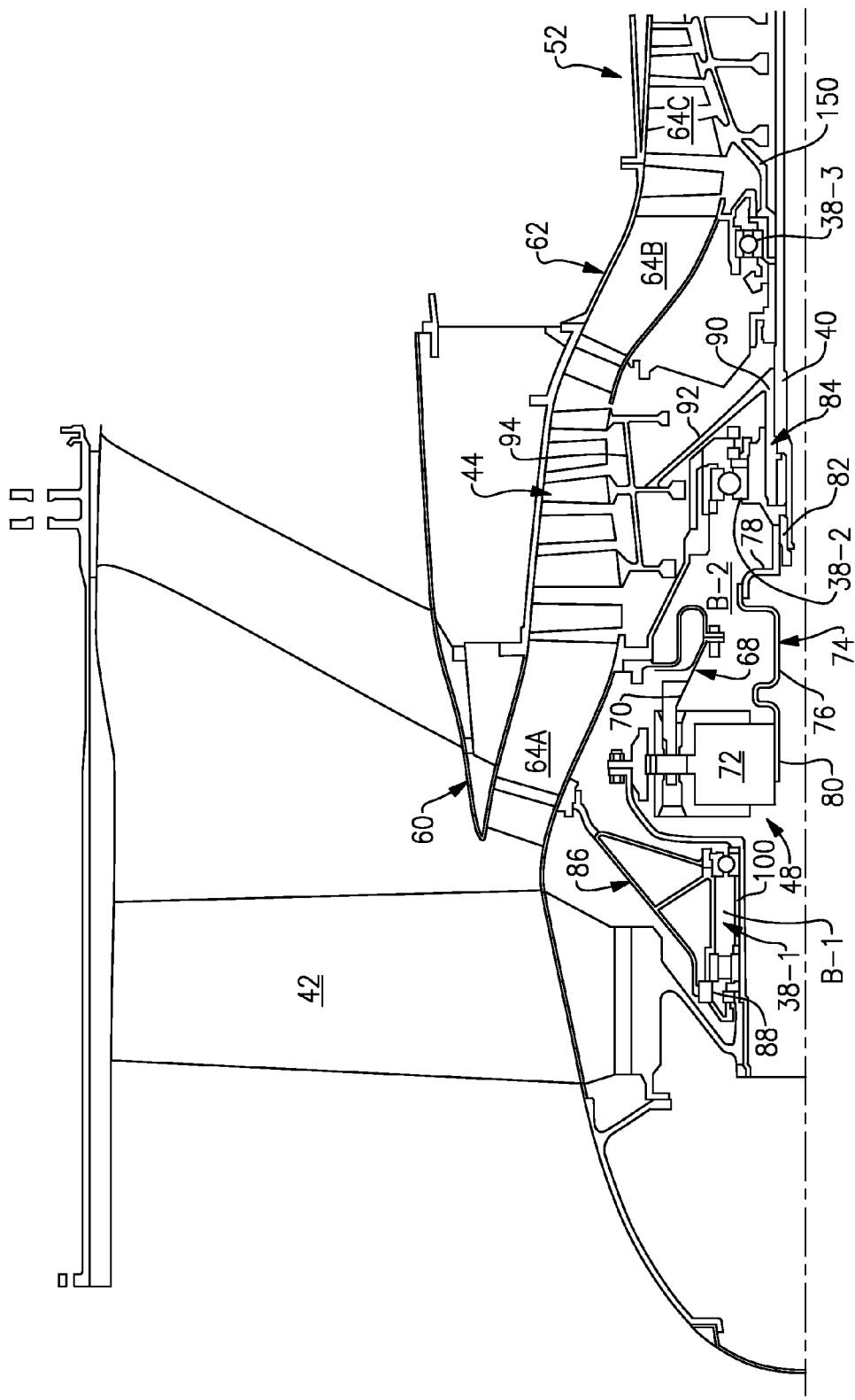
FIG. 2 is an enlarged schematic cross-section of a sectional of the gas turbine engine.

With reference to FIG. 2, the engine static structure 36 proximate the compressor section 24 generally includes a front center body case structure 60 and an intermediate case structure 62 which mounts aft of the front center body case structure 60. It should be appreciated that various case structures may alternatively or additionally be provided, yet benefit from the architecture described herein.

The front center body case structure 60 generally defines an annular core flow path 64A for the core airflow into the low pressure compressor 44. The intermediate case structure 62 defines the core flow path 64B aft of the core flow path 64A into the high pressure compressor 52 core flow path 64C. The core flow path 64B is generally radially inward of the core flow path 64A to transition into the radially smaller diameter core flow path 64C. That is, the core flow path 64B generally defines a "wasp waist" gas turbine engine architecture.

The #2 bearing structure 38-2 at least partially supports the inner shaft 40 relative to the front center body case structure 60. A #3 bearing structure 38-3 generally supports the outer shaft 50 relative the intermediate case structure 62. That is, the #2 bearing structure 38-2 at least partially supports the low spool 30 and the #3 bearing structure 38-3 at least partially supports the high spool 32. It should be appreciated that various bearing systems such as thrust bearing structures and mount arrangements will benefit herefrom.

A flex support 68 provides a flexible attachment of the geared architecture 48 within the front center body case structure 60. The flex support 68 reacts the torsional loads from the geared architecture 48 and facilitates vibration absorption as well as other support functions. A centering spring 70, which is a generally cylindrical cage-like structural component with a multiple of beams that extend between flange end structures, resiliently positions the #2 bearing structure 38-2 with respect to the low spool 30. In one embodiment, the beams are double-tapered beams arrayed circumferentially to control a radial spring rate that may be selected based on a plurality of considerations including, but not limited to, bearing loading, bearing life, rotor dynamics, and rotor deflection considerations.

The gearbox 72 of the geared architecture 48 is driven by the low spool 30 in the disclosed non-limiting embodiment through a coupling shaft 74. The coupling shaft 74 transfers torque through the #2 bearing structure 38-2 to the gearbox 72 as well as facilitates the segregation of vibrations and other transients. The coupling shaft 74 in the disclosed non-limiting embodiment includes a forward coupling shaft section 76 and an aft coupling shaft section 78. The forward coupling shaft section 76 includes an interface spline 80 which mates with the gearbox 72. An interface spline 82 of the aft coupling shaft section 78 connects the coupling shaft 74 to the low spool 30 through, in this non limiting embodiment, a low pressure compressor hub 84 of the low pressure compressor 44.

A fan rotor bearing support structure 86 aft of the fan 42 extends radially inward from the front center body case structure 60. The fan rotor bearing support structure 86 and the front center body case structure 60 defines a bearing compartment B-2. It should be appreciated that various bearing structures 38 and seals 88 may be supported by the fan rotor bearing support structure 86 to contain oil and support rotation of an output shaft 100 which connects with the geared architecture 48 to drive the fan 42.

The low pressure compressor hub 84 of the low pressure compressor 44 includes a tubular hub 90 and a frustro-conical web 92. The tubular hub 90 mounts to the inner shaft 40 through, for example, a splined interface adjacent to the #2 bearing structure 38-2. The frustro-conical web 92 extends in a forwardly direction from the tubular hub 90 axially between the #2 bearing structure 38-2 and the #3 bearing structure 38-3. That is, the frustro-conical web 92 is axially located between the bearing structures 38-2, 38-3.

Figure 3:
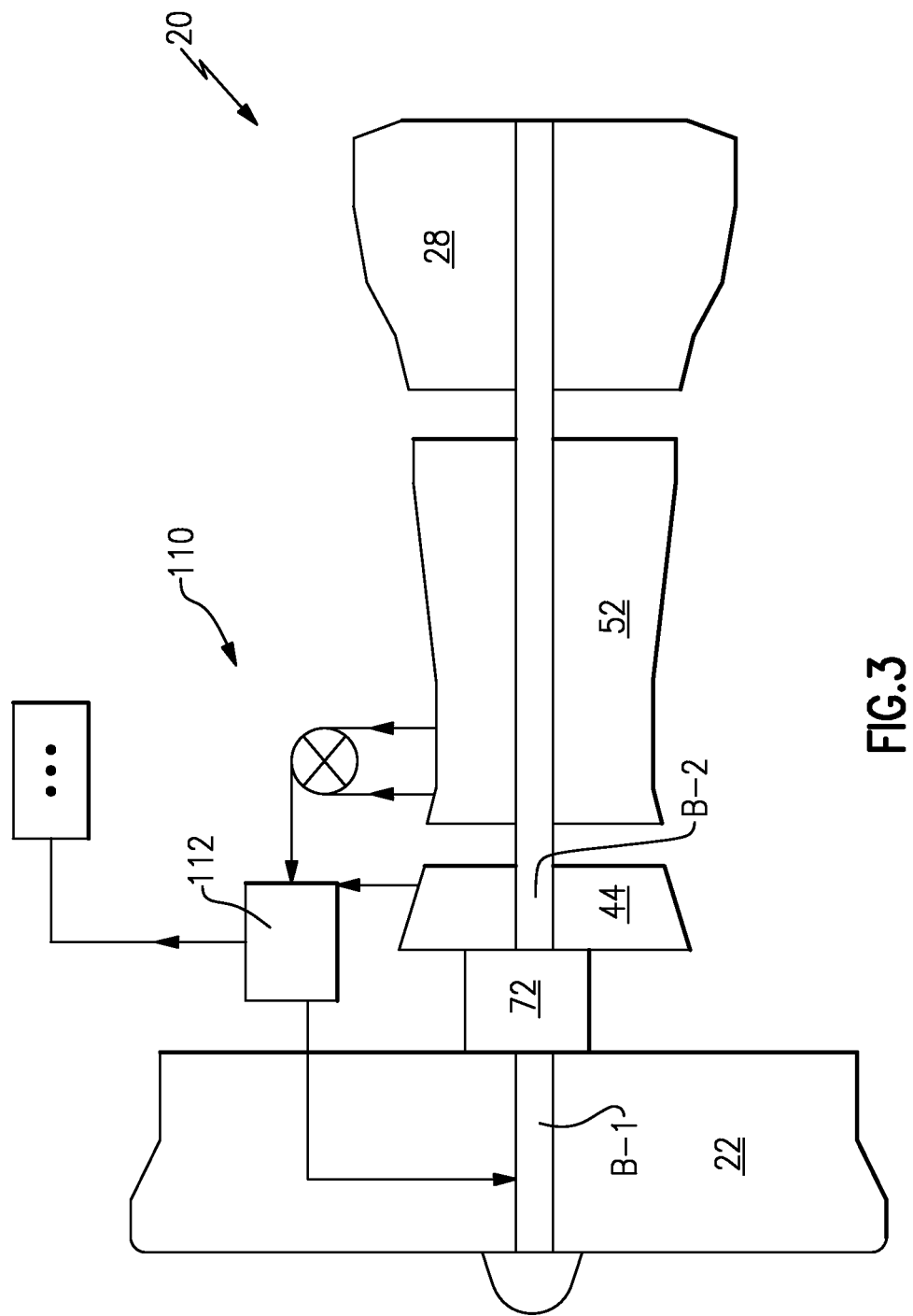
FIG. 3 is a schematic view of a gas turbine engine with a bearing compartment passage structure which bypasses around a geared architecture.

The #1 bearing structure 38-1 supports the output shaft 100 which connects the geared architecture 48 to the fan 42. The #1 bearing structure 38-1 is located within a bearing compartment B-1 that is isolated by the geared architecture 48 from bearing compartment B-2. That is, the #1 bearing compartment B-1 is isolated from the engine core aft of the geared architecture 48 and receives its buffer pressurization supply of buffer supply air through a #1 bearing compartment passage structure 110 that crosses the annular core flow path 64A for the core airflow into the low pressure compressor 44 (FIG. 3).

Figure 4:
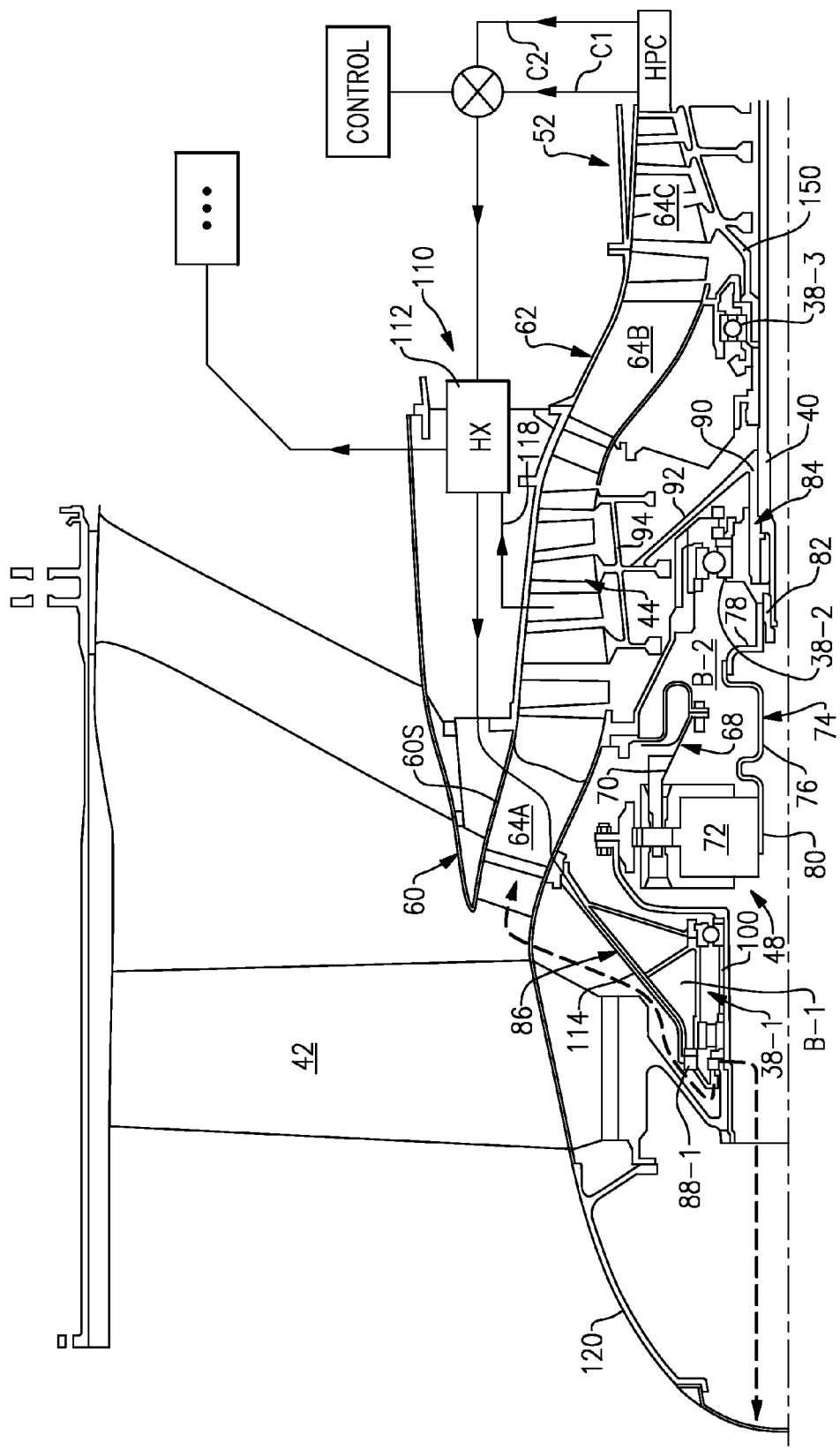
FIG. 4 is an enlarged schematic cross-section of a sectional of the gas turbine engine, which illustrates the bearing compartment passage structure.

With reference to FIG. 4, the #1 bearing compartment passage structure 110 is in communication with the core engine such as with the high pressure compressor 52 to supply a higher pressure bleed air flow of buffer supply air into the #1 bearing compartment B-1 such as the seal 88-1 to, for example, pressurize the seal 88-1 and seal lubricating fluid with respect to the #1 bearing structure 38-1. The buffer supply air may be communicated from various other sources and may pass through, for example, a conditioning device 112 such as a buffer heat exchanger. The conditioning device 112 may further condition bleed flow C1, C2 from the high pressure compressor It should be appreciated the various bleed sources from the high pressure compressor 52 may be selected through a valve 116.

The #1 bearing compartment passage structure 110 may be at least partially defined by a hollow front center body strut 60S of the front center body case structure 60 to permit the buffer supply air to cross the annular core flow path 64A without flow interference. That is, the buffer supply air is communicated through the hollow front center body strut 60S and the core airflow passes around the hollow front center body strut 60S.

From the hollow front center body strut 60S, the buffer supply air is communicated through a passage 114 in the fan rotor bearing support structure 86 to, for example, the seal 88-1. It should be appreciated that various passages may alternatively or additionally be provided.

The passage of buffer supply air through the fan rotor bearing support structure 86 advantageously promotes heat transfer between the buffer supply air and the #1 bearing compartment B-1 to reduce buffer supply air maximum temperate at high power condition and increases buffer supply air minimum temperatures at lower power settings. As the #1 bearing structure 38-1 operates at a generally constant temperature, the #1 bearing compartment B-1 operates as a thermal ground with respect to the buffer supply air.

Downstream of the #1 bearing compartment B-1, the buffer supply air may be communicated in various manners for various usages such as toward the spinner 120 to facilitate spinner die-icing. The buffer supply air may alternatively or additionally be ejected outward aft of the fan 42 to recirculate into the annular core flow path 64A to minimize any effect upon engine efficiency.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Figure 5:
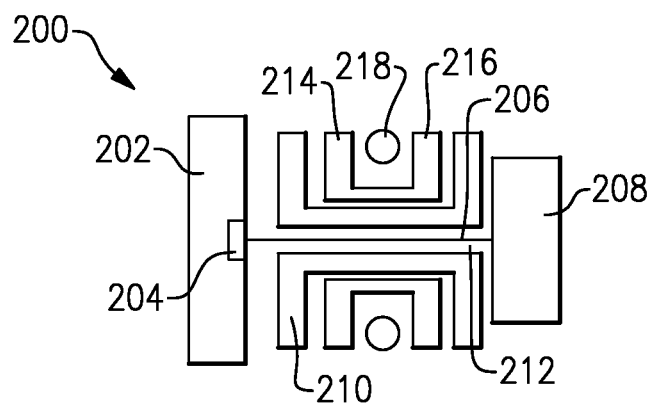
FIG. 5 shows another embodiment.

FIG. 5 shows an embodiment 200, wherein there is a fan drive turbine 208 driving a shaft 206 to in turn drive a fan rotor 202. A gear reduction 204 may be positioned between the fan drive turbine 208 and the fan rotor 202. This gear reduction 204 may be structured and operate like the gear reduction disclosed above. A compressor rotor 210 is driven by an intermediate pressure turbine 212, and a second stage compressor rotor 214 is driven by a turbine rotor 216. A combustion section 218 is positioned intermediate the compressor rotor 214 and the turbine section 216.

Figure 6:
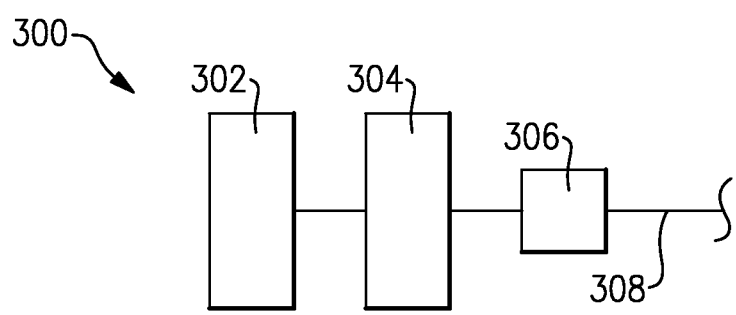
FIG. 6 shows yet another embodiment.

FIG. 6 shows yet another embodiment 300 wherein a fan rotor 302 and a first stage compressor 304 rotate at a common speed. The gear reduction 306 (which may be structured as disclosed above) is intermediate the compressor rotor 304 and a shaft 308 which is driven by a low pressure turbine section.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed:

1. A gas turbine engine comprising:
   a front center body case structure;
   a geared architecture at least partially supported by said front center body case structure;
   a bearing structure mounted to said front center body case structure to rotationally support a shaft driven by said geared architecture, said shaft for driving a fan; and
   a bearing compartment passage structure in communication with said bearing structure through said front center body case structure.

2. The gas turbine engine as recited in claim 1, wherein said bearing structure includes a seal.

3. The gas turbine engine as recited in claim 1, wherein said bearing structure includes a bearing.

4. The gas turbine engine as recited in claim 1, wherein said bearing compartment passage structure includes a hollow front center body strut.

5. The gas turbine engine as recited in claim 4, wherein said hollow front center body strut is in fluid communication with a fan rotor bearing support structure which at least partially supports said bearing structure.

6. The gas turbine engine as recited in claim 1, further comprising a conditioning device in communication with said bearing compartment passage structure.

7. The gas turbine engine as recited in claim 6, wherein said conditioning device is a heat exchanger.

8. The gas turbine engine as recited in claim 6, wherein said conditioning device is in communication with a high pressure compressor.

9. The gas turbine engine as recited in claim 8, wherein said high pressure compressor is axially downstream of said geared architecture.

10. The gas turbine engine as recited in claim 6, wherein said conditioning device is radially outboard of a low pressure compressor.

11. The gas turbine engine as recited in claim 10, wherein said low pressure compressor is downstream of said geared architecture.

12. The gas turbine engine as recited in claim 1, wherein said bearing structure is axially between said fan and said geared architecture.

13. The gas turbine engine as recited in claim 12, wherein said front center body case structure defines a core flow path for a core airflow.

14. The gas turbine engine as recited in claim 1, wherein there are three turbine rotors, with a most downstream of said three turbine rotors driving said geared architecture.

15. A method of communicating a buffer supply air for a gas turbine engine comprising:
   communicating a buffer supply air across a core flow path; and
   communicating the buffer supply air through a hollow front center body strut of a front center body case structure which defines the core flow path, the hollow front center body strut within the core flow path.

16. The method as recited in claim 15, further comprising:
   communicating the buffer supply air to a bearing compartment forward of a geared architecture.

17. The method as recited in claim 15, further comprising:
communicating the buffer supply air through a conditioning device upstream of the hollow front center body strut.

18. The method as recited in claim 15, further comprising:
communicating the buffer supply air to a bearing structure mounted to a front center body case structure which defines the core flow path, the bearing structure rotationally supporting a shaft driven by a geared architecture.

19. The method as recited in claim 18, further comprising:
driving a fan through the geared architecture, the bearing structure axially located between the fan and the geared architecture.

20. A method of communicating a buffer supply air for a gas turbine engine comprising:
communicating a buffer supply air across a core flow path;
communicating the buffer supply air to a bearing structure mounted to a front center body case structure which defines the core flow path, the bearing structure rotationally supporting a shaft driven by a geared architecture;
driving a fan through the geared architecture, the bearing structure axially located between the fan and the geared architecture; and
communicating the buffer supply air to a spinner supported by the fan.

\* \* \* \* \*